United States Patent
Marchini et al.

(10) Patent No.: US 11,267,911 B2
(45) Date of Patent: Mar. 8, 2022

(54) BUTENE-1 POLYMER COMPOSITION HAVING HIGH MELT FLOW RATE

(71) Applicant: BASELL POLIOLEFINE ITALIA S.R.L., Milan (IT)

(72) Inventors: Roberta Marchini, Ferrara (IT); Stefano Spataro, Ferrara (IT); Roberta Pica, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 86 days.

(21) Appl. No.: 16/633,241

(22) PCT Filed: Aug. 3, 2018

(86) PCT No.: PCT/EP2018/071112
§ 371 (c)(1),
(2) Date: Jan. 23, 2020

(87) PCT Pub. No.: WO2019/025585
PCT Pub. Date: Feb. 7, 2019

(65) Prior Publication Data
US 2020/0172642 A1    Jun. 4, 2020

(30) Foreign Application Priority Data

Aug. 4, 2017    (EP) ................................. 17184885

(51) Int. Cl.
| | | |
|---|---|---|
| *C08L 23/18* | (2006.01) | |
| *C08L 23/08* | (2006.01) | |
| *C09J 123/18* | (2006.01) | |
| *C08F 10/08* | (2006.01) | |
| *C09J 123/08* | (2006.01) | |
| *C08L 23/20* | (2006.01) | |
| *C09J 123/20* | (2006.01) | |

(52) U.S. Cl.
CPC .......... *C08F 10/08* (2013.01); *C08L 23/0815* (2013.01); *C08L 23/18* (2013.01); *C08L 23/20* (2013.01); *C08L 2203/12* (2013.01); *C08L 2203/16* (2013.01); *C08L 2205/025* (2013.01); *C08L 2314/06* (2013.01); *C09J 123/0815* (2013.01); *C09J 123/18* (2013.01); *C09J 123/20* (2013.01)

(58) Field of Classification Search
CPC .. C08F 210/08; C08F 210/16; C08F 2500/12; C09J 123/20; C09J 123/0815; C08L 23/18; C08L 23/20; C08L 2205/025
See application file for complete search history.

(56) References Cited

U.S. PATENT DOCUMENTS

| | | | | | |
|---|---|---|---|---|---|
| 4,677,025 | A  * | 6/1987  | Davison | .................. | B32B 27/32 428/349 |
| 7,776,978 | B2 * | 8/2010  | Tonti | ....................... | C08F 10/00 526/116 |
| 7,776,986 | B2 * | 8/2010  | Bacci | ....................... | C08F 10/08 526/348.6 |
| 7,799,871 | B2 * | 9/2010  | Resconi | ................... | C08L 23/20 525/191 |
| 7,943,717 | B2 * | 5/2011  | Morini | ..................... | C08L 23/04 526/348.6 |
| 8,097,681 | B2 * | 1/2012  | Pellegatti | .............. | C08F 210/08 525/232 |
| 8,227,563 | B2 * | 7/2012  | Vitale | ...................... | C08F 10/08 526/348.6 |
| 8,598,285 | B2 * | 12/2013 | Vitale | ...................... | C08F 10/08 526/125.4 |
| 9,249,289 | B2 * | 2/2016  | Ferrari | ................... | C08F 210/08 |
| 9,284,475 | B2 * | 3/2016  | Musacchi | .................. | C09J 7/38 |
| 10,357,407 | B2 * | 7/2019  | Bunnelle | ................. | B32B 23/00 |
| 10,894,850 | B2 * | 1/2021  | Marchini | ............... | C09J 123/20 |
| 11,015,090 | B2 * | 5/2021  | Marchini | ............... | C09J 123/20 |
| 11,060,002 | B2 * | 7/2021  | Corzani | ................. | C08L 23/20 |
| 2009/0326156 | A1 * | 12/2009 | Pellegatti | .............. | C08F 210/08 525/240 |
| 2011/0136981 | A1 * | 6/2011  | Morini | ..................... | C08L 23/04 525/240 |

(Continued)

FOREIGN PATENT DOCUMENTS

| | | |
|---|---|---|
| EP | 0163783 A1  | 12/1985 |
| EP | 0314495 A2  | 5/1989 |
| EP | 3266825 A1  | 1/2018 |
| JP | H01144480 A | 6/1989 |
| JP | 2006298998 A | 11/2006 |
| JP | 2010531372 A | 9/2010 |
| JP | 2011515518 A | 5/2011 |
| JP | 2013227389 A | 11/2013 |
| JP | 2017504667 A | 2/2017 |

OTHER PUBLICATIONS

International Search Report and Written Opinion dated Nov. 7, 2018 (Nov. 7, 2018) for Corresponding PCT/EP2018/071112.

*Primary Examiner* — Rip A Lee

(57) ABSTRACT

A butene-1 polymer composition having a MFR value of from 100 to 300 g/10 min., measured according to ISO 1133 at 190° C. with a load of 2.16 kg, made from or containing:

A) a butene-1 homopolymer or a copolymer of butene-1 with one or more comonomers selected from the group consisting of ethylene and higher alpha-olefins, having a copolymerized comonomer content of up to 5% by mole;

B) a copolymer of butene-1 with one or more comonomers selected from the group consisting of ethylene and higher alpha-olefins, having a copolymerized comonomer content of from 6% to 20% by mole;

wherein the composition having a total copolymerized comonomer content from 4% to 15% by mole, referred to the sum of A) and B), and a content of fraction soluble in xylene at 0° C. of 75% by weight or less, determined on the total weight of A) and B).

11 Claims, No Drawings

(56) References Cited

U.S. PATENT DOCUMENTS

| | | | | |
|---|---|---|---|---|
| 2015/0174281 A1* | 6/2015 | Bunnelle | ............ | A61F 13/15699 |
| | | | | 604/366 |
| 2015/0299527 A1* | 10/2015 | Hashima | ................ | C09J 123/20 |
| | | | | 524/528 |
| 2017/0029670 A1* | 2/2017 | Spataro | .................. | C09J 123/20 |
| 2020/0010742 A1* | 1/2020 | Corzani | ..................... | C09J 5/06 |

* cited by examiner

BUTENE-1 POLYMER COMPOSITION HAVING HIGH MELT FLOW RATE

This application is the U.S. National Phase of PCT International Application PCT/EP2018/071112, filed Aug. 3, 2018, claiming benefit of priority to European Patent Application No. 17184885.6, filed Aug. 4, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a butene-1 polymer composition as well as films, fibers, hot-melt adhesives, polymer additives, and fluidizers made therefrom.

BACKGROUND OF THE INVENTION

Butene-1 polymers having high melt flow rate have been used in many application fields. In those applications, the utility of the butene-1 polymers is believed due to properties such as chemical inertia, mechanical properties and nontoxicity.

In some instances, the molecular weights and molecular weight distribution of the butene-1 polymer have an effect on the final polymer properties.

SUMMARY OF THE INVENTION

In a general embodiment, the present disclosure provides a butene-1 polymer composition having a Melt Flow Rate value of from 100 to 300 g/10 min., alternatively from 110 to 300 g/10 min., alternatively from 150 to 250 g/10 min., measured according to ISO 1133 at 190° C. with a load of 2.16 kg (hereinafter called "MFR") and made from or containing:
  A) a butene-1 homopolymer or a copolymer of butene-1 with one or more comonomers selected from the group consisting of ethylene and higher alpha-olefins, having a copolymerized comonomer content ($C_A$) of up to 5% by mole, alternatively up to 4% by mole; and
  B) a copolymer of butene-1 with one or more comonomers selected from the group consisting of ethylene and higher alpha-olefins, having a copolymerized comonomer content ($C_B$) of from 6% to 20% by mole, alternatively from 8% to 18% by mole;
wherein the composition having a total copolymerized comonomer content from 4% to 15% by mole, alternatively from 5% to 15% by mole, referred to the sum of A) and B), and a content of fraction soluble in xylene at 0° C. of 75% by weight or less, alternatively of 70% by weight or less, determined on the total weight of A) and B).

In some embodiments, the butene-1 polymer composition is obtained directly in polymerization in the absence of free radical generating agents like peroxides, thereby increasing the MFR value and avoiding the chemical contamination and unpleasant odor which results from the introduction of free radical generating agents.

In some embodiments, the present butene-1 polymer composition is blended with other polyolefins, alternatively propylene polymers. In some embodiments, the butene-1 polymer is used in films, fibers, and hot melt compositions.

DETAILED DESCRIPTION OF THE INVENTION

In some embodiments, the amount of fraction soluble in xylene at 0° C. for the butene-1 polymer composition, expressed as the weight content of fraction measured by extraction on the total weight of A) and B), is from 35% to 75% by weight, alternatively from 35% to 70% by weight, alternatively from 40% to 70% by weight, alternatively from 40% to 65% by weight.

When A) is a copolymer, a specific lower limit of comonomer content is of 1% by mole.

In some embodiments, when both A) and B) are copolymers, the difference between the percent values of the copolymerized comonomer contents of B) and A) satisfies the following relation:

$$C_B) - C_A) \geq 5; \text{ alternatively } C_B) - C_A) \geq 6.$$

In some embodiments, the relative amounts of components A) and B) are determined depending upon the total copolymerized comonomer content, the comonomer contents of the single components and their content of fraction soluble in xylene at 0° C.

In some embodiments, the amounts are from 30% to 70% by weight, alternatively from 35% to 65% by weight of A) and from 30% to 70% by weight, alternatively from 35% to 75% by weight of B), the weight percents are in reference to the total weight of A) and B).

In some embodiments, the higher alpha-olefins have the formula $CH_2 = CHR$ wherein R is methyl or an alkyl radical containing 3 to 8 or 3 to 6 carbon atoms. In some embodiments, the higher alpha-olefins are selected from the group consisting of propylene, hexene-1, and octene-1.

In some embodiments, ethylene is the comonomer. In some embodiments, ethylene is the comonomer for component B).

The present butene-1 polymer composition has a measurable crystallinity, as demonstrated by the presence, in the Differential Scanning calorimetry (DSC) pattern, of the melting temperature peaks of crystalline butene-1 polymers.

In some embodiments, the present butene-1 polymer shows one or more melting peaks in the second DSC heating scan. In some embodiments, the temperature peak or peaks occurring at temperatures equal to or lower than 90° C., alternatively equal to or lower than 85° C., alternatively from 40° C. to 90° C., alternatively from 45° C. to 85° C. It is believed that such temperature peaks are attributed to the melting point of crystalline form II of the butene-1 polymers (TmII) and the area under the peak (or peaks) is taken as the global melting enthalpy (DH TmII). However, if more than one peak is present, the highest (most intense) peak is taken as TmII.

In some embodiments, global DH TmII values for the present butene-1 polymer are of 15 J/g or less, alternatively from 4 to 15 J/g, measured with a scanning speed corresponding to 10° C./min.

In some embodiments, the present butene-1 polymer shows one or more melting peaks occurring at temperatures equal to or lower than 100° C., alternatively equal to or lower than 98° C., alternatively from 30° C. to 100° C., alternatively from 30° C. to 98° C., in a DSC heating scan carried out after aging. It is believed that such temperature peak or peaks are attributed to the melting point of crystalline form I of the butene-1 polymers (TmI) and the area under the peak (or peaks) is taken as the global melting enthalpy (DH TmI). However, if more than one peak is present, the highest (most intense) peak is taken as TmI.

In some embodiments, global DH TmI values for the present butene-1 polymer are of 50 J/g or less, alternatively from 25 to 50 J/g, alternatively from 30 to 50 J/g, measured with a scanning speed corresponding to 10° C./min.

In some embodiments, the present butene-1 polymer has a detectable content of crystalline form III. Crystalline form III is detectable via the X-ray diffraction method described in the Journal of Polymer Science Part B: Polymer Letters Volume 1, Issue 11, pages 587-591, November 1963, or Macromolecules, Vol. 35, No. 7, 2002.

In some embodiments, X-ray crystallinity values for the present butene-1 polymer are from 10% to 50%, alternatively from 15% to 45%.

In some embodiments, the MFR values for components A) and B) are broadly selected, provided that the MFR values of the overall composition are obtained.

The logarithm of the MFR value of polyolefin blends is given by the sum of the products of the weight fraction and the logarithm of the MFR value of the single components.

Therefore, the MFR value of a composition made of a blend of components A) and B) is determined by the following relation:

$$\log \mathrm{MFR}(A+B) = wA \log \mathrm{MFR}(A) + wB \log \mathrm{MFR}(B)$$

where MFR (A+B) is the MFR value for the blend of A) and B), MFR (A) and MFR (B) are the MFR values of components A) and B) respectively and wA and wB are the respective weight fractions. For instance, wA and wB are both 0.5 when the blend is made of 50% by weight of component A) and 50% by weight of component B).

In some embodiments and to achieve good fluidity in the molten state, the MFR values of the single components A) and B) are in the range of from 50 to 400 g/10 min., alternatively from 80 to 350 g/10 min.

In some embodiments, the present butene-1 polymer composition has at least one of the following further features:

- an intrinsic viscosity (IV) measured in tetrahydronaphthalene (THN) at 135° C. equal to lower than 0.70 dl/g, alternatively equal to or lower than 0.65 dl/g, alternatively from 0.50 dl/g to 0.70 dl/g, alternatively from 0.50 dl/g to 0.65 dl/g;
- a Mw/Mn value, where Mw is the weight average molar mass and Mn is the number average molar mass, both measured by GPC (Gel Permeation Chromatography), equal to or lower than 3.5, alternatively equal to or lower than 2.5, the lower limit being of 1.5 for the ranges;
- a Mz value of 90,000 g/mol or higher, alternatively 100,000 g/mol or higher, alternatively from 90,000 to 200,000 g/mol, alternatively from 100,000 to 190,000 g/mol;
- Mw equal to or greater than 50,000 g/mol, alternatively equal to or greater than 70,000 g/mol, alternatively from 50,000 to 180,000 g/mol, alternatively from 70,000 to 150,000 g/mol;
- isotactic pentads (mmmm) measured with $^{13}$C-NMR operating at 150.91 MHz higher than 90%; alternatively higher than 93%, alternatively higher than 95%;
- 4,1 insertions not detectable using a $^{13}$C-NMR operating at 150.91 MHz;
- a yellowness index lower than 0; alternatively from 0 to −10, alternatively from −1 to −9, alternatively from −1 to −5;
- a Shore D value equal to or lower than 50, alternatively equal to or lower than 45, alternatively from 15 to 50, alternatively from 15 to 45;
- a tensile stress at break, measured according to ISO 527, of from 10 MPa to 45 MPa, alternatively from 10 MPa to 35 MPa;
- a tensile elongation at break, measured according to ISO 527, of from 400% to 900%; alternatively from 450% to 700%;
- a glass transition temperature of −19° C. or less, alternatively of −20° C. or less, wherein the lower limit is −23° C.
- a density of 0.880 g/cm$^3$ or more, alternatively 0.885 g/cm$^3$ or more; wherein the upper limit is of 0.910 g/cm$^3$, alternatively of 0.899 g/cm$^3$.

In some embodiments, the butene-1 polymer components A) and B) are obtained by polymerizing the monomer(s) in the presence of a metallocene catalyst system obtainable by contacting:

- a stereorigid metallocene compound;
- an alumoxane or a compound capable of forming an alkyl metallocene cation; and, optionally,
- an organo aluminum compound.

In some embodiments, the stereorigid metallocene compound belongs to the following formula (I):

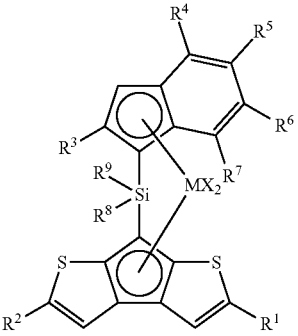

wherein:

M is an atom of a transition metal selected from those belonging to group 4; alternatively M is zirconium;

X, equal to or different from each other, is a hydrogen atom, a halogen atom, a R, OR, OR'O, OSO$_2$CF$_3$, OCOR, SR, NR$_2$ or PR$_2$ group wherein R is a linear or branched, saturated or unsaturated C$_1$-C$_{20}$-alkyl, C$_3$-C$_{20}$-cycloalkyl, C$_6$-C$_{20}$-aryl, C$_7$-C$_{20}$-alkylaryl or C$_7$-C$_{20}$-arylalkyl radical, optionally containing heteroatoms belonging to groups 13-17 of the Periodic Table of the Elements; and R' is a C$_1$-C$_{20}$-alkylidene, C$_6$-C$_{20}$-arylidene, C$_7$-C$_{20}$-alkylarylidene, or C$_7$-C$_{20}$-arylalkylidene radical; alternatively X is a hydrogen atom, a halogen atom, a OR'O or R group; alternatively X is chlorine or a methyl radical;

R$^1$, R$^2$, R$^5$, R$^6$, R$^7$, R$^8$ and R$^9$, equal to or different from each other, are hydrogen atoms, or linear or branched, saturated or unsaturated C$_1$-C$_{20}$-alkyl, C$_3$-C$_{20}$-cycloalkyl, C$_6$-C$_{20}$-aryl, C$_7$-C$_{20}$-alkylaryl or C$_7$-C$_{20}$-arylalkyl radicals, optionally containing heteroatoms belonging to groups 13-17 of the Periodic Table of the Elements; in some embodiments, R$^5$ and R$^6$, and/or R$^8$ and R$^9$ form a saturated or unsaturated, 5 or 6 membered rings; in some embodiments, the ring bears C$_1$-C$_{20}$ alkyl radicals as substituents; with the proviso that at least one of R$^6$ or R$^7$ is a linear or branched, saturated or unsaturated C$_1$-C$_{20}$-alkyl radical, optionally containing heteroatoms belonging to groups 13-17 of the Periodic Table of the Elements; alternatively a C$_1$-C$_{10}$-alkyl radical;

R$^3$ and R$^4$, equal to or different from each other, are linear or branched, saturated or unsaturated C$_1$-C$_{20}$-alkyl radicals, optionally containing heteroatoms belonging to groups 13-17 of the Periodic Table of the Elements; alternatively R$^3$ and R$^4$ equal to or different from each other are C$_1$-C$_{10}$-alkyl radicals; alternatively $R^3$ is a methyl, or ethyl radical; and $R^4$ is a methyl, ethyl or isopropyl radical.

In some embodiments, the compounds of formula (I) have formula (Ia):

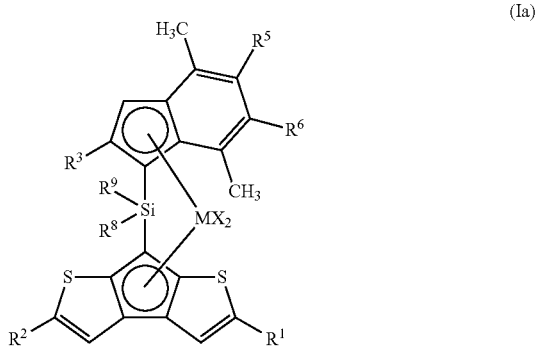

(Ia)

wherein:
M, X, $R^1$, $R^2$, $R^5$, $R^6$, $R^8$ and $R^9$ are as described above;
$R^3$ is a linear or branched, saturated or unsaturated $C_1$-$C_{20}$-alkyl radical, optionally containing heteroatoms belonging to groups 13-17 of the Periodic Table of the Elements; alternatively $R^3$ is a $C_1$-$C_{10}$-alkyl radical; alternatively $R^3$ is a methyl, or ethyl radical.

In some embodiments, the metallocene compounds are selected from the group consisting of dimethylsilyl{(2,4,7-trimethyl-1-indenyl)-7-(2,5-dimethyl-cyclopenta[1,2-b:4,3-b']-dithiophene)}zirconium dichloride; dimethylsilanediyl{(1-(2,4,7-trimethylindenyl)-7-(2,5-dimethyl-cyclopenta[1,2-b:4,3-b']-dithiophene)}Zirconium dichloride and dimethylsilanediyl{(1-(2,4,7-trimethylindenyl)-7-(2,5-dimethyl-cyclopenta[1,2-b:4,3-b']-dithiophene)}zirconium dimethyl.

In some embodiments, the alumoxanes are selected from the group consisting of methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

In some embodiments, the compounds capable of forming an alkylmetallocene cation are compounds of formula $D^+E^-$, wherein $D^+$ is a Brønsted acid, able to donate a proton and react irreversibly with a substituent X of the metallocene of formula (I) and $E^-$ is a compatible anion, which is able to stabilize the active catalytic species originating from the reaction of the two compounds and sufficiently labile to be able to be removed by an olefinic monomer. In some embodiments, the anion $E^-$ is made from or contains one or more boron atoms.

In some embodiments, the organo aluminum compound is selected from the group consisting of trimethylaluminum (TMA), triisobutylaluminum (TIBA), tris(2,4,4-trimethylpentyl)aluminum (TIOA), tris(2,3-dimethylbutyl)aluminum (TDMBA) and tris(2,3,3-trimethylbutyl)aluminum (TTMBA).

In some embodiments, the catalyst system and polymerization processes employing the catalyst system are as described in Patent Cooperation Treaty Publication Nos. WO2004099269 and WO2009000637.

In some embodiments, the two components A) and B) of the present butene-1 polymer composition are prepared separately and then blended together in the molten state by polymer processing apparatuses. In some embodiments, the polymer processing apparatuses are mono- and twin screw extruders.

In some embodiments, the present butene-1 polymer composition is prepared directly in polymerization.

The polymerization process for producing the composition includes at least two sequential stages, carried out in two or more reactors connected in series, wherein components A) and B) are prepared in separate subsequent stages, operating in each stage, except for the first stage, in the presence of the polymer formed and the catalyst used in the preceding stage.

In some embodiments, the polymerization process is carried out in liquid phase, optionally in the presence of an inert hydrocarbon solvent, or in gas phase, using fluidized bed or mechanically agitated gas phase reactors.

In some embodiments, the catalyst is added in the first reactor, or in more than one reactor.

In some embodiments, the hydrocarbon solvent is aromatic or aliphatic. In some embodiments, the aromatic hydrocarbon solvent is toluene. In some embodiments, the aliphatic hydrocarbon solvent is selected from the group consisting of propane, hexane, heptane, isobutane, cyclohexane, 2,2,4-trimethylpentane and isododecane.

In some embodiments, the polymerization process is carried out by using liquid butene-1 as polymerization medium. In some embodiments, the polymerization temperature is from 20° C. to 150° C., alternatively between 50° C. and 90° C., alternatively from 65° C. to 82° C.

In some embodiments, the concentration of hydrogen in the liquid phase during the polymerization reaction (molar ppm $H_2$/butene-1 monomer) is from 1000 ppm to 1900 ppm, alternatively from 1100 ppm to 1800 ppm.

In some embodiments, the amount of comonomer in the liquid phase is from 0.1% to 8% by weight, alternatively from 0.2% to 6% by weight, with respect to the total weight of comonomer and butene-1 monomer present in the polymerization reactor. In some embodiments, the comonomer is ethylene.

In some embodiments, for the preparation of component A) the amount of comonomer is from 0.1% to 0.9%, alternatively from 0.2% to 0.8% by weight. In some embodiments, the comonomer is from 1% to 8% by weight, alternatively from 1.5% to 6% by weight, for the preparation of component B).

In some embodiments for hot-melt adhesive applications, the present butene-1 polymer composition is blended with other materials.

In some embodiments, the present disclosure provides a hot-melt adhesive polyolefin composition made from or containing one or more of the following optional components, in addition to the present butene-1 polymer composition made from or containing components A) and B):
I) at least one additional polymer;
II) at least one resin material different from (I);
III) at least one wax or oil; and
IV) a nucleating agent.

In some embodiments, the additional polymer is selected from the group consisting of amorphous poly-alpha-olefins, thermoplastic polyurethanes, ethylene/(meth)acrylate copolymers, ethylene/vinyl acetate copolymers and mixtures thereof. In some embodiments, the resin material different from (I) is selected from the group consisting of aliphatic hydrocarbon resins, terpene/phenolic resins, polyterpenes, rosins, rosin esters and derivatives thereof and mixtures thereof. In some embodiments, the wax or oil is selected from the group consisting of mineral, paraffinic or naphthenic waxes and oils. In some embodiments, the nucleating agent is selected from the group consisting of isotactic polypropylene, polyethylene, amides, stearamides, and talc.

In some embodiments, the amounts by weight of the optional components, with respect to the total weight of the hot-melt adhesive polyolefin composition, when present and independently from each other are:

from 0.1% to 25%, alternatively from 1% to 25% by weight of I);
from 10% to 75%, alternatively from 10% to 40% by weight of II);
from 0.1% to 50%, alternatively from 1% to 30% by weight of III); and
from 0.01% to 1%, alternatively from 0.1% to 1% by weight of IV).

In some embodiments, the components are added and blended in the molten state with the present butene-1 polymer composition by polymer processing apparatuses. In some embodiments, the polymer processing apparatuses are mono- and twin screw extruders.

In some embodiments, the hot-melt adhesive compositions are used in paper and packaging industry, furniture manufacture, and the production of nonwoven articles. In some embodiments, the furniture manufacture includes edgebands, softforming applications, and paneling in high moisture environments. In some embodiments, the edgebands are square edges. In some embodiments, the nonwoven articles include disposable diapers. In some embodiments, the butene-1 polymer is used in films or fibers. In some embodiments, the present disclosure provides a butene-1 polymer composition for use as a fluidizer for lubricants.

EXAMPLES

Various embodiments, compositions and methods as provided herein are disclosed below in the following examples. These examples are illustrative only, and are not intended to limit the scope of the invention.

The following analytical methods are used to characterize the polymer compositions.

Thermal Properties (Melting Temperatures and Enthalpies)

Determined by Differential Scanning calorimetry (D.S.C.) on a Perkin Elmer DSC-7 instrument, as hereinafter described.

For the determination of TmII (the melting temperature measured in the second heating run) a weighed sample (5-10 mg) obtained from the polymerization was sealed into an aluminum pan and heated at 200° C. with a scanning speed corresponding to 10° C./minute. The sample was kept at 200° C. for 5 minutes to allow a complete melting of the crystallites, thereby cancelling the thermal history of the sample. Successively, after cooling to −20° C. with a scanning speed corresponding to 10° C./minute, the peak temperature was taken as the crystallization temperature (Tc). After standing for 5 minutes at −20° C., the sample was heated for a second time at 200° C. with a scanning speed corresponding to 10° C./min. In this second heating run, the peak temperature measured was taken as (TmII). If more than one peak was present, the highest (most intense) peak was taken as TmII. The area under the peak (or peaks) was taken as global melting enthalpy (DH TmII).

The melting enthalpy and the melting temperature were also measured after aging (without cancelling the thermal history) as follows by using Differential Scanning calorimetry (D.S.C.) on a Perkin Elmer DSC-7 instrument. A weighed sample (5-10 mg) obtained from the polymerization was sealed into an aluminum pan and heated at 200° C. with a scanning speed corresponding to 10° C./minute. The sample was kept at 200° C. for 5 minutes to allow a complete melting of the crystallites. The sample was then stored for 10 days at room temperature. After 10 days the sample was subjected to DSC, cooled to −20° C., and then the sample was heated at 200° C. with a scanning speed corresponding to 10° C./min. In this heating run, the peak temperature was taken as the melting temperature (TmI). If more than one peak was present, the highest (most intense) peak was taken as TmI. The area under the peak (or peaks) was taken as global melting enthalpy after 10 days (DH TmI).

MFR

Determined according to norm ISO 1133 with a load of 2.16 kg at 190° C. (standard die).

Intrinsic Viscosity

Determined according to norm ASTM D 2857 in tetrahydronaphthalene at 135° C.

Density

The density of samples was measured according to ISO 1183-1 (ISO 1183-1 method A "Methods for determining the density of non-cellular plastics—Part 1: Immersion method, liquid pycnometer method and titration method"; Method A: Immersion method, for solid plastics (except for powders) in void-free form). Test specimens were taken from compression molded plaques conditioned for 10 days before carrying out the density measure.

Comonomer Contents

Comonomer contents were determined via FT-IR.

The spectrum of a pressed film of the polymer was recorded in absorbance vs. wavenumbers ($cm^{-1}$). The following measurements were used to calculate the ethylene content:

a) area ($A_t$) of the combination absorption bands between 4482 and 3950 $cm^{-1}$ which is used for spectrometric normalization of film thickness.
b) factor of subtraction ($FCR_{C2}$) of the digital subtraction between the spectrum of the polymer sample and the absorption band due to the sequences BEE and BEB (B: butene-1 units, E: ethylene units) of the methylenic groups ($CH_2$ rocking vibration).
c) Area ($A_{C2,block}$) of the residual band after subtraction of the $C_2PB$ spectrum, which comes from the sequences EEE of the methylenic groups ($CH_2$ rocking vibration).

Apparatus

A Fourier Transform Infrared spectrometer (FTIR) was used.

A hydraulic press with platens heatable to 200° C. (Carver or equivalent) was used.

Method

Calibration of (BEB+BEE) Sequences

A calibration straight line was obtained by plotting % (BEB+BEE) wt vs. $FCR_{C2}/A_t$. The slope $G_r$ and the intercept $I_r$ were calculated from a linear regression.

Calibration of EEE Sequences

A calibration straight line was obtained by plotting % (EEE) wt vs. $A_{C2,block}/A_t$. The slope $G_H$ and the intercept $I_H$ were calculated from a linear regression.

Sample Preparation

Using a hydraulic press, a thick sheet was obtained by pressing about 1.5 g of sample between two aluminum foils. If homogeneity was in question, a minimum of two pressing operations was performed. A small portion was cut from the sheet to mold a film. The film thickness ranged between 0.1-0.3 mm.

The pressing temperature was 140±10° C.

The IR spectrum of the sample film was collected as soon as the sample was molded.

Procedure

The instrument data acquisition parameters were as follows:

Purge time: 30 seconds minimum.
Collect time: 3 minutes minimum.
Apodization: Happ-Genzel.
Resolution: 2 cm$^{-1}$.

Collect the IR spectrum of the sample vs. an air background.

Calculation

Calculate the concentration by weight of the BEE+BEB sequences of ethylene units:

$$\%(BEE+BEB)wt = G_r \cdot \frac{FCR_{C2}}{A_t} + I_r$$

Calculate the residual area (AC2,block) after the subtraction described above, using a baseline between the shoulders of the residual band.

Calculate the concentration by weight of the EEE sequences of ethylene units:

$$\%(EEE)wt = G_H \cdot \frac{A_{C2,block}}{A_t} + I_H$$

Calculate the total amount of ethylene percent by weight:

$$\% C2wt = [\%(Bee+BEB)wt + \%(EEE)wt]$$

NMR Analysis of Chain Structure $^{13}$C NMR spectra were acquired on a Bruker AV-600 spectrometer equipped with cryo-probe, operating at 150.91 MHz in the Fourier transform mode at 120° C.

The peak of the $T_{\beta\delta}$ carbon (nomenclature according to C. J. Carman, R. A. Harrington and C. E. Wilkes, *Macromolecules*, 10, 3, 536 (1977)) was used as an internal reference at 37.24 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove $^1$H-$^{13}$C coupling. About 512 transients were stored in 32K data points using a spectral window of 9000 Hz.

The assignments of the spectra, the evaluation of triad distribution and the composition were made according to Kakugo [M. Kakugo, Y. Naito, K. Mizunuma and T. Miyatake, *Macromolecules*, 16, 4, 1160 (1982)] and Randall [J. C. Randall, *Macromol. Chem Phys.*, C30, 211 (1989)] using the following:

$BBB=100(T_{\beta\beta})/S=I5$ $BBE=100T_{\beta\delta}/S=I4$ $EBE=100P_{\delta\delta}/S=I14$ $BEB=100S_{\beta\beta}/S=I13$ $BEE=100S_{\alpha\delta}/S=I7$ $EEE=100(0.25S_{\gamma\delta}+0.5S_{\delta\delta})/S=0.25I9+0.5I10$

| Area | Chemical Shift | Assignments | Sequence |
|------|----------------|-------------|----------|
| 1 | 40.40-40.14 | Sαα | BBBB |
| 2 | 39.64 | Tδδ | EBE |
|   | 39-76-39.52 | Sαα | BBBE |
| 3 | 39.09 | Sαα | EBBE |
| 4 | 37.27 | Tβδ | BBE |
| 5 | 35.20-34.88 | Tββ | BBB |
| 6 | 34.88-34.49 | Sαγ | BBEB + BEBE |
| 7 | 34.49-34.00 | Sαδ | EBEE + BBEE |
| 8 | 30.91 | Sγγ | BEEB |
| 9 | 30.42 | Sγδ | BEEE |
| 10 | 29.90 | Sδδ | EEE |
| 11 | 27.73-26.84 | Sβδ + 2B$_2$ | BBB + BBE EBEE + BBEE |
| 12 | 26.70 | 2B$_2$ | EBE |
| 13 | 24.54-24.24 | Sββ | BEB |
| 14 | 11.22 | Pδδ | EBE |
| 15 | 11.05 | Pβδ | BBE |
| 16 | 10.81 | Pββ | BBB |

To a first approximation, the mmmm was calculated using 2B2 carbons as follows:

| Area | Chemical shift | assignments |
|------|----------------|-------------|
| B1 | 28.2-27.45 | mmmm |
| B2 | 27.45-26.30 | |

$mmmm = B_1*100/(B_1+B_2-2*A_4-A_7-A_{14})$

Mw/Mn and Mz Determination by GPC

Measured by way of Gel Permeation Chromatography (GPC) in 1,2,4-trichlorobenzene (TCB). Molecular weight parameters (Mn, Mw, Mz) and molecular weight distributions Mw/Mn for the samples were measured by using a GPC-IR apparatus by PolymerChar, which was equipped with a column set of four PLgel Olexis mixed-bed (Polymer Laboratories) and an IR5 infrared detector (PolymerChar). The dimensions of the columns were 300×7.5 mm and their particle size was 13 μm. The mobile phase flow rate was kept at 1.0 mL/min. The measurements were carried out at 150° C. Solution concentrations were 2.0 mg/mL (at 150° C.) and 0.3 g/L of 2,6-di-tert-butyl-p-cresol were added to prevent degradation. For GPC calculation, a universal calibration curve was obtained using 12 polystyrene (PS) reference samples supplied by PolymerChar (peak molecular weights ranging from 266 to 1220000). A third-order polynomial fit was used to interpolate the experimental data and obtain the relevant calibration curve. Data acquisition and processing were done by using Empower 3 (Waters). The Mark-Houwink relationship was used to determine the molecular weight distribution and the relevant average molecular weights: the K values were $K_{PS}=1.21\times10^4$ dL/g and $K_{PB}=1.78\times10^4$ dL/g for PS and polybutene (PB) respectively, while the Mark-Houwink exponents α=0.706 for PS and α=0.725 for PB were used.

For butene/ethylene copolymers, the composition of each sample was assumed constant in the whole range of molecular weight and the K value of the Mark-Houwink relationship was calculated using a linear combination as reported below:

$K_{EB} = x_E K_{PE} + x_B K_{PB}$ where $K_{EB}$ is the constant of the copolymer, $K_{PE}$ (4.06×10⁻⁴, dL/g) and $K_{PB}$ (1.78×10⁴ dL/g) are the constants of polyethylene (PE) and PB, $x_E$ and $x_B$ are the ethylene and the butene weight relative amount with $x_E+x_B=1$. The Mark-Houwink exponents α=0.725 was used for the butene/ethylene copolymers independently on the composition. End processing data treatment was fixed for the samples to include fractions up at 1000 in terms of molecular weight equivalent. Fractions below 1000 were investigated via GC.

Fractions Soluble and Insoluble in Xylene at 0° C. (XS–0° C.)

2.5 g of polymer composition and 250 cm³ of o-xylene were introduced into a glass flask equipped with a refrigerator and a magnetic stirrer. The temperature was raised in 30 minutes up to the boiling point of the solvent. The obtained clear solution was then kept under reflux and stirring for further 30 minutes. The closed flask was then cooled to 100° C. in air for 10 to 15 minutes under stirring and then kept for 30 minutes in thermostatic water bath at 0° C. for 60 minutes. The formed solid was filtered on quick filtering paper at 0° C. 100 cm³ of the filtered liquid was poured in a pre-weighed aluminum container which was heated on a heating plate under nitrogen flow, to remove the solvent by evaporation. The percent by weight of polymer soluble (Xylene Solubles at 0° C.=XS 0° C.) was calculated from the average weight of the residues. The insoluble fraction in o-xylene at 0° C. (xylene Insolubles at 0° C.=XI %0° C.) was:

$$XI\%0° C.=100-XS\%0° C.$$

Determination of X-Ray Crystallinity

The X-ray crystallinity was measured with an X-ray Diffraction Powder Diffractometer (XDPD) that uses the Cu-Kα1 radiation with fixed slits and able to collect spectra between diffraction angle 2Θ=5° and 2Θ=35° with step of 0.1° every 6 seconds. The samples were diskettes of about 1.5-2.5 mm of thickness and 2.5-4.0 cm of diameter made by compression molding. The diskettes were aged at room temperature (23° C.) for 96 hours. After this preparation the specimen was inserted in the XDPD sample holder. The XRPD instrument was set to collect the XRPD spectrum of the sample from diffraction angle 2Θ=5° to 2Θ=35° with steps of 0.1° by using counting time of 6 seconds, and at the end the final spectrum was collected.

Ta was defined as the total area between the spectrum profile and the baseline expressed in counts/sec·2Θ. Aa was defined as the total amorphous area expressed in counts/sec·2Θ. Ca was defined as the total crystalline area expressed in counts/sec·2Θ.

The spectrum or diffraction pattern was analyzed in the following steps:
1) define a linear baseline for the whole spectrum and calculate the total area (Ta) between the spectrum profile and the baseline;
2) define an amorphous profile, along the whole spectrum, that separate, the amorphous regions from the crystalline ones according to the two phase model;
3) calculate the amorphous area (Aa) as the area between the amorphous profile and the baseline;
4) calculate the crystalline area (Ca) as the area between the spectrum profile and the amorphous profile as Ca=Ta−Aa; and
5) calculate the degree of crystallinity (% Cr) of the sample using the formula:

$$\% Cr=100\times Ca/Ta$$

Flexural Modulus

According to norm ISO 178, measured 10 days after molding.

Shore D

According to norm ISO 868, measured 10 days after molding.

Tensile Stress and Elongation at Break

According to norm ISO 527 on compression molded plaques, measured 10 days after molding.

Glass Transition Temperature Via DMTA (Dynamic Mechanical Thermal Analysis)

Molded specimens of 76 mm by 13 mm by 1 mm were fixed to a DMTA machine for tensile stress. The frequency of the tension was fixed at 1 Hz. The DMTA translated the elastic response of the specimen starting from −100° C. to 130° C. The elastic response was plotted versus temperature. The elastic modulus for a viscoelastic material was defined as E=E'+iE". In some instances, the DMTA split the two components E' and E" by resonance and plotted E' vs temperature and E'/E"=tan (δ) vs temperature.

The glass transition temperature Tg was assumed to be the temperature at the maximum of the curve E'/E"=tan (δ) vs temperature.

Yellowness Index

Determined accordingly to ASTM D1925.

Example 1 and Comparative Example 1

Preparation of the Metallocene Catalyst (A-1)

Dimethylsilyl{(2,4,7-trimethyl-1-indenyl)-7-(2,5-dimethyl-cyclopenta[1,2-b:4,3-b']-dithiophene)}zirconium dichloride (A-1) was prepared according to Example 32 of Patent Cooperation Treaty Publication No. WO0147939.

Preparation of the Catalytic Solution

Under nitrogen atmosphere, 8.1 L of a solution of 4.5% wt/v of TIBA in isododecane (1.84 mol of TIBA) and 760 mL of a solution 30% wt/wt of MAO in toluene (3.65 moles of MAO) were loaded in a 20 L jacketed glass reactor equipped with an anchor stirrer and allowed to react at room temperature for about 1 hour under stirring.

After this time, the metallocene A-1 (1.6 g, 2.75 mmol) was added and dissolved under stirring for about 30 minutes.

The final solution was discharged from the reactor into a cylinder through a filter to remove solid residues (if any).

The composition of the solution was as follows:

| Al g/L | Zr % w | Al/Zr mol ratio | Metallocene Conc. mg/L |
|---|---|---|---|
| 16.7 | 0.028 | 1996 | 181 |

Polymerization

The polymerization was carried out continuously in a pilot plant including two stirred reactors connected in series in which liquid butene-1 constituted the liquid medium.

The catalytic solution was fed in both reactors.

The polymerization conditions are reported in Table 1.

TABLE 1

| | Ex. 1 |
|---|---|
| Operative conditions (first reactor) | |
| Temperature (° C.) | 75 |
| H₂ in liquid phase (ppm mol) | 1540 |

TABLE 1-continued

|  | Ex. 1 |
|---|---|
| $C_2H_4$ in liquid phase (weight %) | 0.36 |
| Mileage (kg/gMe) | 2777 |
| Split (weight %) | 42 |
| $C_2H_4$ content of A) (weight %) | 0.9 |
| $C_2H_4$ content of A) (mole %) | 1.8 |
| Operative conditions (second reactor) |  |
| Temperature (° C.) | 75 |
| $H_2$ in liquid phase (ppm mol) | 1560 |
| $C_2H_4$ in liquid phase (weight %) | 4.1 |
| Split (weight %) | 58 |
| $C_2H_4$ content of B) (weight %) | 6.4 |
| $C_2H_4$ content of B) (mole %) | 12 |
| Total mileage | 2747 |
| Total $C_2H_4$ content (mole %) | 7.7 |

Note:
$C_2H_4$ = ethylene; kg/g Me = kilograms of polymer per gram of metallocene catalyst (A-1);
Split = amount of polymer produced in the concerned reactor.

In Table 2 the properties of the final products are specified.

Table 2 reports also the properties of the butene-1 polymer taken as comparison (Comparative Example 1), which was a commercial copolymer containing 6.8% by mole of ethylene, prepared with a Ziegler-Natta catalyst and subsequently subjected to a peroxide treatment.

TABLE 2

|  |  | Ex. 1 | Comp. 1 |
|---|---|---|---|
| MFR 190° 2.16 Kg | g/10 min | 210 | 200 |
| Intrinsic Viscosity | dl/g | 0.61 | 0.69 |
| $C_2H_4$ IR | mol % | 7.7 | 6.8 |
| TmII | ° C. | 83.4 | 81.4 |
| DH TmII | J/g | 11.7 | 16.5 |
| TmI | ° C. | 93 | 92.5 |
| DH TmI | J/g | 40.2 | 40.4 |
| X - Ray crystallinity | % | 34 | 38 |
| Xylene Soluble at 0° C. | % | 55.7 | 63.4 |
| Mw | g/mol | 87903 | 88370 |
| Mn | g/mol | 40726 | 28182 |
| Mw/Mn |  | 2.2 | 3.1 |
| Mz | g/mol | 149487 | 148561 |
| Density | g/cm³ | 0.898 | 0.899 |
| Flexural Modulus | MPa | 130 | 140 |
| Strength at Break | MPa | 17.9 | 21.1 |
| Elongation at Break | % | 580 | 470 |
| Hardness Shore D | D | 37.8 | 40.3 |
| Glass transition temperature | ° C. | −21.6 | −18 |

What is claimed is:

1. A butene-1 polymer composition having a MFR value from 100 to 300 g/10 min measured according to ISO 1133 at 190° C. with a load of 2.16 kg, and comprising:
   A) a butene-1 homopolymer or a copolymer of butene-1 with one or more comonomers selected from the group consisting of ethylene and higher alpha-olefins, having a copolymerized comonomer content ($C_A$) of up to 5% by mole; and
   B) a copolymer of butene-1 with one or more comonomers selected from the group consisting of ethylene and higher alpha-olefins, having a copolymerized comonomer content ($C_B$) of from 6% to 20% by mole;
wherein the butene-1 polymer composition has a total copolymerized comonomer content from 4% to 15% by mole based on a sum of A) and B), and a content of fraction soluble in xylene at 0° C. of 75% by weight or less based on a total weight of A) and B).

2. The butene-1 polymer composition of claim 1, comprising from 30% to 70% by weight of A) and from 30% to 70% by weight of B), based on the total weight of A) and B).

3. The butene-1 polymer composition of claim 1, having DH TmII values of from 4 to 15 J/g, measured with a scanning speed corresponding to 10° C./min.

4. The butene-1 polymer composition of claim 1, having a Mw/Mn value, where Mw is weight average molar mass and Mn is number average molar mass, both measured by GPC, equal to or lower than 3.5.

5. The butene-1 polymer composition of claim 1, having a Mz value, measured by GPC, of 90,000 g/mol or higher.

6. The butene-1 polymer composition of claim 1, having a Mw value equal to or greater than 50,000 g/mol.

7. A process for preparing the butene-1 polymer composition of claim 1, comprising:
   carrying out at least two sequential stages in two or more reactors connected in series, wherein A) and B) are prepared in separate subsequent stages, operating in each stage, except the first stage, in the presence of a polymer formed and a catalyst used in a preceding stage.

8. The process of claim 7, carried out in the presence of a metallocene catalyst obtained by contacting:
   a stereorigid metallocene compound;
   an alumoxane or a compound that forms an alkyl metallocene cation; and, optionally,
   an organo aluminum compound.

9. A manufactured article comprising:
   the butene-1 polymer composition of claim 1.

10. The manufactured article of claim 9 wherein the manufactured article is a film or a fiber.

11. A hot-melt adhesive composition comprising:
   the butene-1 polymer composition of claim 1.

* * * * *